United States Patent Office 3,526,743
Patented Sept. 1, 1970

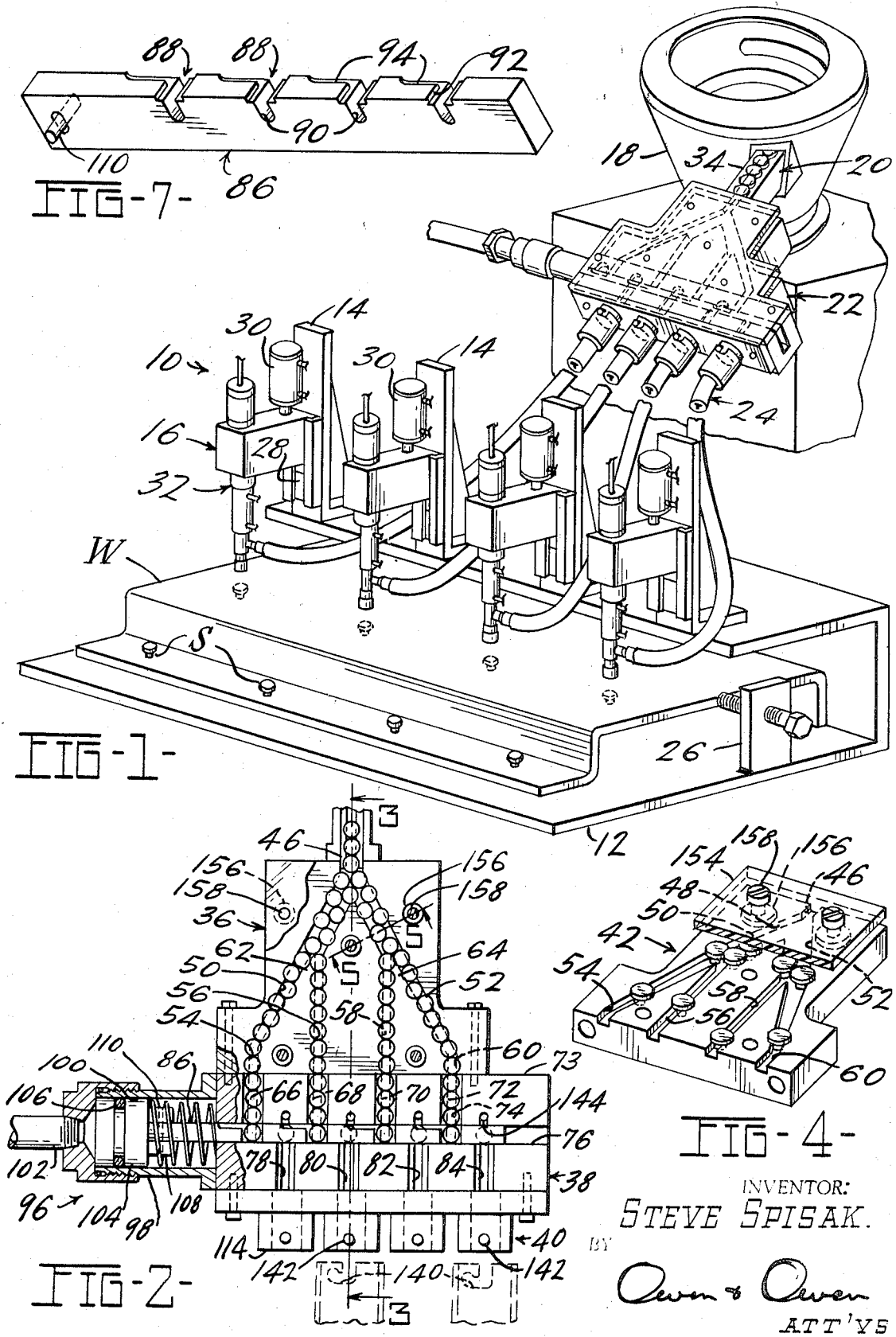

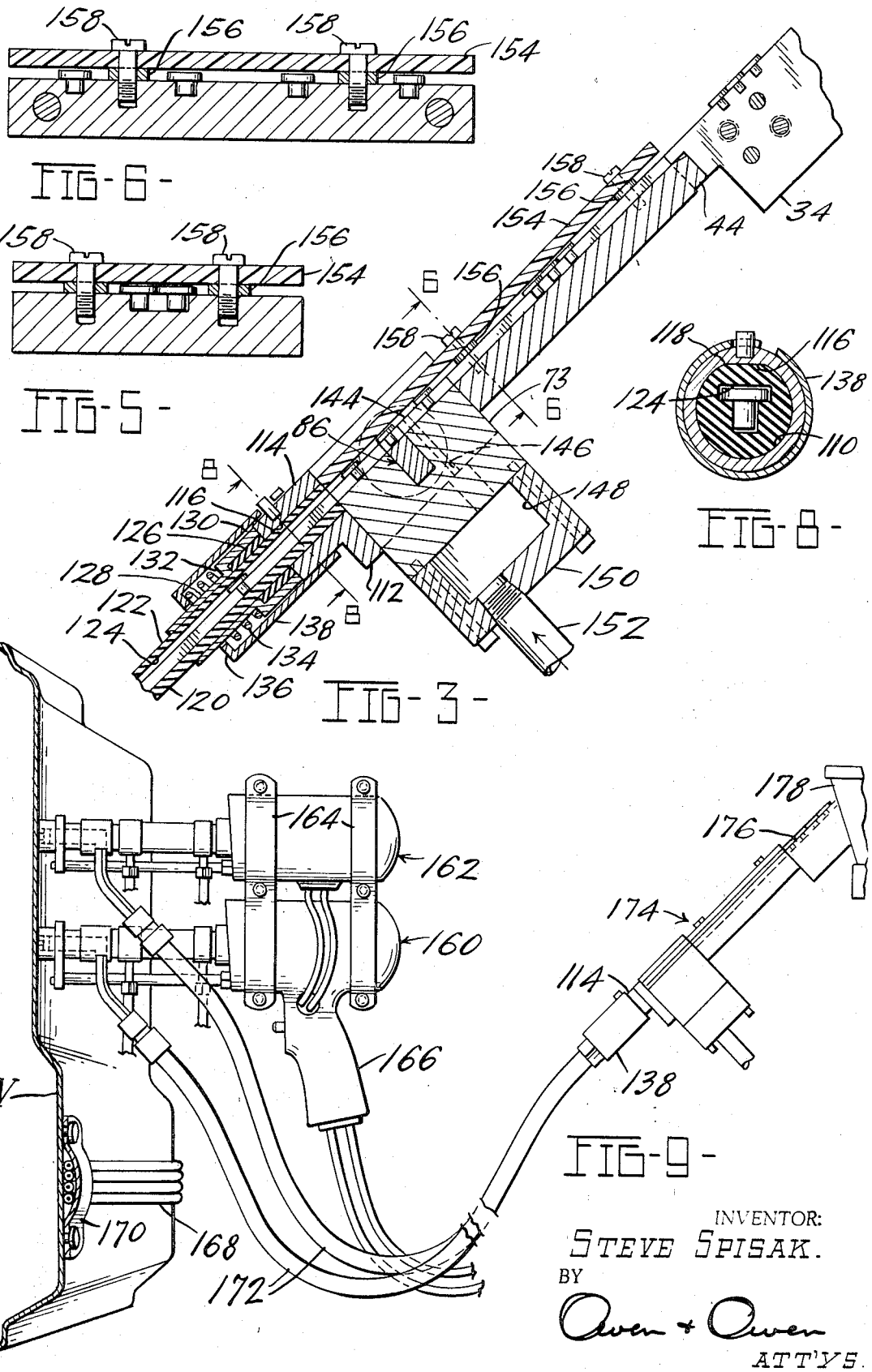

3,526,743
APPARATUS FOR DISPENSING STUDS TO PLURAL WELDING TOOLS
Steve Spisak, Elyria, Ohio, assignor, by mesne assignments, to TRW Inc., Cleveland, Ohio, a corporation of Ohio
Filed May 26, 1967, Ser. No. 641,574
Int. Cl. B23k 9/20
U.S. Cl. 219—98         3 Claims

ABSTRACT OF THE DISCLOSURE

A welding system is capable of rapidly welding a plurality of studs to a workpiece simultaneously. A supply system feeds studs to welding tools which effect the welds, with the supply system including a single source of studs with a single escapement mechanism capable of feeding studs sequentially to each of several flexible feed tubes respectively connected to the tool. The escapement includes a single track communicating with the stud supply source, with this track branching into a manifold track which communicates with a plurality of additional tracks. A transfer bar is associated with the latter tracks and feeds the studs individually yet simultaneously to the feed tubes. The feed system further has an air supply for blowing the studs down the tubes to the welding tools.

---

This invention relates to a fastening system for affixing simultaneously a plurality of fasteners to a workpiece, and specifically to a feeding system for supplying weldable studs to a plurality of welding tools.

The use of small studs to serve as various types of fasteners for connecting components to a workpiece is becoming more widespread. In some of these applications, it has been found to be advantageous to weld a plurality of the studs to the workpiece simultaneously, which enables the production rate to be substantially increased. By way of example, small studs of T-shaped cross section are often used to affix decorative trim to automobile bodies. The studs are welded to the bodies, clips are placed thereon, and the trim is snapped onto the clips. In welding the studs to the automobile bodies, hand-operated portable welding tools have been employed which are individually operated by production line workers who fasten the studs to the bodies as the automobiles move down the line.

It has been found advantageous, in some instances, to apply the studs to some components of the automobile body, e.g., a door or fender panel, immediately after the component is made. Thus, after the door or other component is stamped, it can be moved to a nearby location at which the small studs are immediately welded to the door. With this arrangement, stationary welding machines can be employed and welds can be made by all of the welding tools simultaneously to enable the studs to be applied in a relatively short period of time, compared to the time required for an individual operator to apply the studs one at a time at the production line. Also, with the stationary welding machine, the studs can be applied with utmost accuracy and uniformity.

The use of a plurality of welding tools to weld studs simultaneously, however, need not be limited to stationary welding machines. For example, electrical wires in an automobile can be supported at a surface through a plastic strap which is stretched over and held by two of the small T-shaped studs welded to the surface at spaced apart, predetermined distances. It has been found advantageous to weld both of the studs simultaneously by a welding tool having two welding heads, or by two welding tools which are connected together in predetermined relationship. In either instance, the tool is handled by one operator who simultaneously welds both studs at the desired positions on the automobile surface at which the wires are to be located.

The present invention relates to a unique stud supply system by means of which the studs can be supplied to the individual welding tools simultaneously and rapidly whereby the system is capable of easily welding over a hundred studs a minute. In the feeding system, a single source of studs is employed and a single escapement is also used which is capable of receiving studs from the source and distributing them simultaneously and singularly to feed tubes, down which the studs are blown to the individual welding tools. The feed system is capable of rapid operation yet is relatively simple and maintenance free.

It is, therefore, a principal object of the invention to provide apparatus for welding simultaneously a plurality of studs to a workpiece.

Another object of the invention is to provide a feeding system for feeding a plurality of studs to a plurality of welding tools from a single supply source.

Other objects and advantages of the invention will be apparent from the following detailed description of preferred embodiments thereof, reference being made to the accompanying drawings, in which:

FIG. 1 is a somewhat schematic view in perspective of welding apparatus embodying the invention, with part of the feed mechanism shown on an enlarged scale;

FIG. 2 is a further enlarged, plan view of the escapement mechanism shown in FIG. 1;

FIG. 3 is an enlarged view in longitudinal cross section taken along the line 3—3 of FIG. 2;

FIG. 4 is a view in perspective of a portion of the escapement mechanism of FIG. 2;

FIG. 5 is a transverse sectional view taken along the line 5—5 of FIG. 2;

FIG. 6 is a transverse sectional view taken along the line 6—6 of FIG. 3;

FIG. 7 is a view in perspective of another component of the escapement mechanism of FIG. 2;

FIG. 8 is a sectional view taken along the line 8—8 of FIG. 3; and

FIG. 9 is a somewhat schematic view in elevation of modified welding apparatus for simultaneously welding two studs to a workpiece.

Referring to FIG. 1, apparatus for simultaneously welding a plurality of studs to a workpiece W is indicated at 10. The workpiece W can constitute a door or a quarter panel of an automobile body, for example, to which trim is to be affixed by the studs S. The studs have enlarged heads spaced from the surface of the body by stems, the ends of which are end-welded to the surface. Heretofore, studs S have commonly been welded to the automobile body on the assembly line by a plurality of operators using portable hand tools moving along the sides of the line. It has been found, however, that by welding a plurality of the studs S simultaneously, to a component of the automobile body immediately after it is stamped or otherwise formed, the welding can be accomplished more quickly and the studs can be placed more uniformly and accurately on the automobile body component.

The apparatus 10 includes a base 12 having a plurality of stands 14 each supporting a welding unit indicated at 16. Studs are automatically feed to the welding units 16 from a supply source 18, down an inclined track 20 and to an escapement mechanism 22 embodying the invention. From here the studs are blown simultaneously down four flexible feed tubes 24 to the welding units 16. The studs are welded simultaneously to the workpiece W which is supported on the base 12 in a predetermined position as by a suitable adjustable stop 26. While the welding units 16 are shown in a single row, they may be located in several rows or on a curved path to accommodate a curved piece of molding, for example. In the embodiment shown, two rows of the studs S are welded to the workpiece W to receive two trim strips or the like.

The welding units 16 are mounted on guides 28 of the stands 14 and are moved up and down by suitable pneumatic cylinders 30 to retract the units out of the way when a workpiece is being placed on or removed from the base 12. Welding tools 32 of the welding units 16 can be of the type shown in my co-pending application, Ser. No. 358,736, having the usual means for retracting the stud after a pilot arc is drawn and for plunging the stud when a welding arc is established, to weld the studs to the workpiece by an arc welding technique. Such tools also have chambers to receive the studs and plungers for moving the studs from the chambers into the chucks which hold the studs during the welding cycles. For welding the small studs to the workpiece and causing minimum deformation or dimpling of the workpiece, a capacitor power source preferably is employed, as shown in Glorioso Pat. No. 3,316,880.

The source 18 of studs can be of numerous types; as shown, it is in the nature of a vibratory hopper having an inclined, spiral ramp up which the studs are moved by controlled vibrations. The ramp also has means for orienting the studs so they are fed sequentially and in proper position to the inclined track 20. The track 20 can be formed by a pair of parallel bars 34 spaced apart by suitable means to receive the stems of the studs therebetween and the heads of the studs thereon.

The escapement mechanism 22 includes three basic components, including a distributing unit 36, a transfer unit 38, and a connecting unit 40 providing connections for the feed tubes 24. Referring particularly to FIGS. 2–4, the distributing unit 36 includes a block member 42 having a projecting neck 44 (FIG. 3) which cooperates with the lower ends of the guide track bars 34 to align the track with an entrance track or channel 46 formed at the upper edge of the block 42. The entrance track 46 forms a smooth continuation of the guide track to receive the studs sequentially from the track. The block member 42 further includes a manifold track or channel 48 which receives the studs S from the entrance track 46 and has two main legs 50 and 52 which feed the studs to four branch tracks or channels 54, 56, 58, and 60. The upper portions of the manifold track legs 50 and 52 are wide enough to receive studs substantially in two rows, as shown in FIGS. 2 and 5. A projection 62 located between the branch tracks 54 and 56 directs the studs in the lower row of the leg 50 to the branch track 56, with a similar projection 64 being located between the tracks 58 and 60 to supply studs to the track 58. The upper or outer row of studs in each of the track legs 50 and 52 then continues downwardly through narrower portions of the legs 50 and 52 to the outer branch tracks 54 and 60.

The four branch tracks 54–60 communicate with four escapement tracks or branch track extensions 66, 68, 70, and 72 of a transfer block 73 of the transfer unit 38. The escapement tracks 66–72 each receive the stems of the studs and also have upper side grooves or recesses 74 to receive the heads of the studs. The transfer block 73 further has a groove 76 extending transversely at the lower ends of the escapement tracks 66–72, and below the transverse groove 76 are four exit tracks 78, 80, 82, and 84 which are shaped in cross section similar to the escapement tracks 66–72. The spacing or extent of offset of the exit track 78 from the escapement track 66 is the same as that of the track 80 from the track 68, the track 82 from the track 70, and the track 84 from the track 72.

As shown particularly in FIG. 7, a transfer bar 86 is slidably received in the transverse groove 76 for reciprocatory movement therein. The bar 86 has four notches 88 of generally T-shaped configuration with deep grooves 90 to receive the stems of the studs and shallower upper grooves 92 to receive the heads of the studs. A shallow groove 94 also is associated with each of the notches 88 at the upper edge of the bar 86 to receive edges of the stud heads when in the lower ends of the escapement tracks 66–72.

The transfer bar 86 is reciprocated in the groove 76 by a compact pneumatic drive unit 96 as shown in FIG. 2. The drive unit 96 includes a housing 98 affixed to one end of the transfer block 73 and forming an air cylinder 100 to which air is supplied from a line 102. An air piston 104 is located in the cylinder 100 and includes a suitable O-ring seal 106. The piston 104 has a clevis 108 on the forward end thereof which is connected to an end of the transfer bar 86 by a pin 110. This design provides a compact drive arrangement for the transfer bar 86, with the stroke of the piston 104 being relatively short, only sufficient to move the notches 88 of the transfer bar 86 from the escapement tracks 66–72 to the respective exit tracks 78–84.

The connecting unit 40 includes a supporting and spacing bar 112 affixed to the transfer block 73 and having four cylindrical connecting projections 114 extending therefrom. Non-circular passages 116 (FIGS. 3 and 8) extend through both the projections 114 and the bar 112 to the lower face of the transfer block. As shown, each of the passages 116 is generally cylindrical except for an upper flat portion 118. The flexible feed tubes 24 are of similar configuration with a cylindrical portion 120 and an upper flat portion 122 cooperating with the flat 118 to be received in the passages 116 in oriented relationship. With this arrangement, it is assured that a T-shaped track 124 in the tube 120 is precisely aligned with the exit tracks 78–84.

The feed tubes 24 can be quickly attached to and detached from the connecting unit 40 to facilitate rapid change of the tubes for replacement or repair, for example. For this purpose, each of the tubes 24 has a plastic sleeve or ring 126 (FIG. 3) affixed thereto at a predetermined distance from the end of the tube. A metal sleeve member 128 is located around the tube with an enlarged portion 130 around the ring 126 and forming a shoulder 132. A spring 134 is located around the sleeve member and bears against the shoulder 132 as well as an end 136 of an outer connection 138. The latter is received on the projection 114 and has an L-shaped slot 140 (FIG. 2) cooperating with a pin 142 on the projection. The feed tubes 24 then can be easily connected to and detached from the escapement 22 and yet the tubes can be easily and accurately aligned with the exit passages 78–84.

When the studs are transferred to the exit passages 78–84, they are blown down the tubes 24 to the welding tools by air supplied through outlets 144 (FIG. 3) in the transfer block 73, with the outlets 144 communicating with transverse supply passages 146 extending through the block. The latter passages communicate with a manifold chamber 148 formed by a housing 150 affixed to the bottom of the transfer block. Air for this chamber is supplied through a line 152. The air for both the chamber 148 and the cylinder 100 can be controlled as disclosed in my co-pending application Ser. No. 358,736 or in a co-pending application of Paul A. Glorioso, Ser. No. 439,418 now Pat. No. 3,487,190.

In order to maintain the studs S in the manifold track 48 without overlapping and jamming therein, a cover 154 is located thereon and spaced above the top of the distribution block member 36 by precision spacers or washers 156 which are preferably located around fasteners or cap screws 158. The distance between the bottom of the stud tracks and the lower surface of the cover 154 is accurately maintained so that the studs cannot lock or jam or even tilt to the point that the head of one stud will overlap the head of an adjacent stud. The dimensions are also controlled closely so that the distance between the upper surface of the block 73 and the lower surface of the cover 154 will freely accommodate the heads of the studs. The cover 154 is transparent so that any jamming in the escapement can be readily located by an operator.

The precise spacing of the cover is not necessary with T-shaped tracks such as those employed for the transfer tracks 66-72 or the exit tracks 78-84, but such T-shaped tracks cannot be employed for the manifold track legs 50 and 52 where studs are in two or more rows. Hence, the precise positioning of the cover 154 is important in that location to fit closely with the stud heads to prevent tilting, and yet enable the studs to move by gravity along the tracks.

The multiple track escapement can also be used to supply studs to fewer or more stud welding units. An application in which studs are supplied to two welding units is shown in FIG. 9. In this instance, two portable welding tools 160 and 162 are connected together by suitable banding or brackets 164. The lower welding tool 160 has a handle 166 connected therewith which can be manipulated by a welding operator to position and operate both of the tools 160 and 162. The tools, in this instance, are used to weld two studs simultaneously a predetermined distance apart, as shown in the lower part of FIG. 9. Here, the studs are welded to a workpiece W and electrical conductors or wires indicated at 168 are placed therebetween against the workpiece. A plastic strap 170 with keyhole slots at opposite ends is then placed over the heads of the studs to hold the wires 168 in place.

Studs can be supplied to the stud inlet chambers through feed tubes 172 which are connected to a two-track multi-escapement mechanism 174 which can be similar to the escapement mechanism 22 but with only two exit tracks. The four track escapement can be employed if two of the tracks are blocked by suitable means. Automatic blocking means can also be used in the exit tracks to stop the stud supply to any one of the welding units in the event of malfunction.

The escapement mechanism 174 is located in a central, stationary position while the welding tools 160 and 162 are moved about. Studs are supplied to the escapement 174 from an inclined track 176 to which the studs are sequentially supplied in proper position by a suitable source 178.

Various modifications of the above described embodiments of the invention will be apparent to those skilled in the art, and it is to be understood that such modifications can be made without departing from the scope of the invention.

I claim:

1. Apparatus for welding simultaneously a plurality of studs having stems and heads with circular transverse cross sections to at least one workpiece, said apparatus comprising a plurality of welding tools, each having a chuck to receive a stud to be welded, means for supporting the stud in said chuck, and means for spacing said tools apart at predetermined distances, a feed tube for each welding tool, a single source of studs, a single supply track, said stud source having means for orienting the studs and supplying them to said track in a single row with the heads in alignment and the stems therebelow, escapement means for feeding studs from said supply track toward the plurality of feed tubes, said escapement means having a single entrance track communicating with said supply track, a single manifold track communicating with said entrance track, a plurality of substantially parallel branch tracks, one for each of said tubes, communicating with said manifold track, said escapement means having a cover with a lower planar surface spaced a distance above the bottom of said manifold track and said branch tracks, which distance slightly exceeds the length of said studs whereby said cover and the bottom cooperate to maintain the studs upright in said tracks, said cover also being spaced above the upper edges of said branch tracks a distance slightly exceeding the thickness of the heads of said studs to prevent tilting and jamming of the heads of adjacent studs in said branch tracks, said branch tracks having a width exceeding the diameters of the stems but being less than the diameters of the heads, substantially parallel escapement tracks forming extensions of said branch tracks, a groove extending transversely at the ends of said escapement tracks, an escapement bar having openings to receive studs from said escapement tracks, means for reciprocating said bar in said groove, said escapement means further forming, on the side of said groove opposite said escapement tracks, a plurality of exit tracks, one for each tube, and air passage means for supplying air to said exit tracks and toward said tubes to blow studs in said exit tracks through said tubes, and toward said tools.

2. An escapement mechanism for supplying fasteners of T-shaped configuration in longitudinal cross section and having stems with heads above the stems from a single supply source to a plurality of feed tubes each communicating with a tool, a single supply track receiving a single row of oriented studs from said source, said escapement comprising block means forming an entrance communicating with the supply tracks, a manifold track communicating with said entrance, at least part of the width of said manifold track exceeding the maximum dimension of the heads of said fasteners being fed, a cover on said block means, spacers between said block means and said cover to space a lower surface thereof a fixed distance above the bottom of said manifold track, which distance slightly exceeds the maximum length of said fasteners, whereby said cover cooperates with the heads of the fasteners and the bottom of said manifold track cooperates with the ends of the stems of the fasteners to maintain the fasteners upright in said manifold track when moving therealong, a plurality of branch tracks communicating with said manifold track and a plurality of escapement tracks forming extensions of said branch tracks, said spacers also spacing the lower surface of said cover a distance above the block means which slightly exceeds the thickness of the fastener heads to enable the lower surface of said cover to cooperate with the upper surface of said block means to aid in maintaining the fasteners in upright positions when in said branch tracks, the width of said branch tracks exceeding the thickness of the stems of the fasteners, said block means forming a plurality of exit tracks below and offset from said escapement tracks, a transfer member having openings to receive fasteners from said escapement tracks and to transfer them to said exit tracks, means for moving said transfer member to align said openings alternately with said escapement tracks and said exit tracks, and means for supplying air through said exit tracks toward the feed tubes to blow fasteners from the exit tracks through the tubes, said supply means comprising an air outlet in said block means aligned with each of said exit tracks, an air supply passage for each of said outlets extending transversely through said block means to the lower side thereof, means forming a manifold chamber at the bottom of said block means communicating with said transverse passages, and an air supply pipe for supplying air to said manifold chamber.

3. An escapement mechanism according to claim 2 wherein said manifold track has two legs disposed in a generally inverted V-shaped configuration with the apex of the V communicating with said entrance and with the inner edges of the V communicating with said branch tracks.

References Cited

UNITED STATES PATENTS

| | | |
|---|---|---|
| 2,657,404 | 11/1953 | Kasper. |
| 2,356,103 | 8/1944 | Tourjee. |
| 2,481,670 | 9/1949 | Japikse. |
| 3,309,495 | 3/1967 | Shoup et al. ___ 219—98 |

JOSEPH V. TRUHE, Primary Examiner

R. E. O'NEILL, Assistant Examiner

U.S. Cl. X.R.

221—68